United States Patent
Lo et al.

(10) Patent No.: US 12,433,901 B2
(45) Date of Patent: *Oct. 7, 2025

(54) COMPOUNDS AND METHODS FOR PREVENTION AND TREATMENT OF CORONAVIRUS INFECTIONS

(71) Applicant: ARJIL BIOTECH HOLDING COMPANY LIMITED, Hsinchu (TW)

(72) Inventors: Jir-Mehng Lo, Hsinchu (TW); Cheng Huang, Taichung (TW); Yeh B Wu, Hsinchu (TW); Hui-Ju Liang, Taipei (TW); Pei-Hsin Lin, Hsinchu (TW); Hao Chiang, Taipei (TW); Wei-Chung Chiou, Taipei (TW)

(73) Assignee: ARJIL BIOTECH HOLDING COMPANY LIMITED, Hsinchu (TW)

(*) Notice: Subject to any disclaimer, the term of this patent is extended or adjusted under 35 U.S.C. 154(b) by 1132 days.

This patent is subject to a terminal disclaimer.

(21) Appl. No.: 17/245,828

(22) Filed: Apr. 30, 2021

(65) Prior Publication Data

US 2021/0338690 A1 Nov. 4, 2021

Related U.S. Application Data

(60) Provisional application No. 63/018,690, filed on May 1, 2020.

(51) Int. Cl.
| | |
|---|---|
| A61K 31/575 | (2006.01) |
| A61K 31/365 | (2006.01) |
| A61K 31/4162 | (2006.01) |
| A61K 45/06 | (2006.01) |
| A61P 31/14 | (2006.01) |

(52) U.S. Cl.
CPC .......... *A61K 31/575* (2013.01); *A61K 31/365* (2013.01); *A61K 31/4162* (2013.01); *A61K 45/06* (2013.01); *A61P 31/14* (2018.01)

(58) Field of Classification Search
CPC .............................. A61K 31/575; A61P 31/14
See application file for complete search history.

(56) References Cited

U.S. PATENT DOCUMENTS

| | | | |
|---|---|---|---|
| 2005/0148504 A1 | 7/2005 | Katunuma et al. | |
| 2010/0210889 A1 | 8/2010 | Wu et al. | |
| 2014/0105928 A1* | 4/2014 | Stamets | A61K 36/074 424/195.15 |
| 2017/0228150 A1 | 8/2017 | Wu et al. | |
| 2020/0268771 A1 | 8/2020 | Wu et al. | |
| 2021/0308201 A1* | 10/2021 | Stamets | A61K 31/716 |

FOREIGN PATENT DOCUMENTS

| | | | | |
|---|---|---|---|---|
| TW | 202200175 A | * | 1/2022 | ........... A23L 33/145 |

OTHER PUBLICATIONS

Daga et al. From SARS-CoV to Coronavirus Disease 2019 (COVID-19)—A Brief Review, Journal of Advanced Research in Medicine, vol. 6, Issue 4—1019, Feb. 2020, pp. 1-9 (Year: 2020).*
TW202200175A Machine Translation (Year: 2022).*
International Search Report for International Application No. PCT/US2021/029840, dated Sep. 1, 2021.
Written Opinion of the International Searching Authority for International Application No. PCT/US2021/029840, dated Sep. 1, 2021.
Wu et al., "Analysis of therapeutic targets for SARS-CoV-2 and discovery of potential drugs by computational methods", Acta Pharmaceutica Sinica B, Feb. 27, 2020, pp. 766-788.
Yang et al., "Antrodia camphorata Potentiates Neuroprotection against Cerebral Ischemia in Rats vis Downregulation of INOS/HO-1/Bax and Activated Caspase-3 and Inhibition of Hydroxyl Radical Formation", Evidence-Based Complementary and Alternative Medicine, vol. 2015, Aug. 25, 2015, pp. 1-8.

* cited by examiner

*Primary Examiner* — Kortney L. Klinkel
*Assistant Examiner* — Mikhail O'donnel Robinson
(74) *Attorney, Agent, or Firm* — Birch, Stewart, Kolasch & Birch, LLP

(57) ABSTRACT

The present invention pertains to anti-coronaviral compounds. The disclosure includes a method for preventing and/or treating a coronavirus infection through the inhibition of a cysteine protease in a virus, particularly SARS-COV-2. Also provided includes the composition/pharmaceutical composition for preventing and/or treating a coronavirus infection comprising any of the compounds, pharmaceutically acceptable salt thereof, or its mixture, and the use of the compounds.

1 Claim, 4 Drawing Sheets

COMPOUNDS AND METHODS FOR PREVENTION AND TREATMENT OF CORONAVIRUS INFECTIONS

CROSS-REFERENCE TO RELATED APPLICATIONS

This application claims the benefit of prior U.S. Provisional Application Ser. No. 63/018,690 filed May 1, 2020, the disclosure of which is incorporated herein in it its entirety for all purposes.

FIELD OF THE INVENTION

The present invention provides some anti-coronaviral compounds and the method and composition/pharmaceutical composition for prevention and treatment of coronavirus infections, particularly the disease caused by SARS-COV-2.

BACKGROUND OF THE INVENTION

Severe acute respiratory syndrome (SARS) outbreak in Nov. 1, 2002 to Jun. 18, 2003 led to 801 deaths in over 29 countries and 8465 probable cases around the world according to the World Health Organization (WHO) (Chen et al., 2005). SARS, an enveloped β coronavirus containing positive-sense, single-stranded RNA, has a genome size of about 30 kb, in which open reading frame (ORF) 1a and 1b encode for two respective polyproteins (pps), pp1a and pp1ab (Hegyi et al., 2002; Needle et al., 2015). To complete its lifecycle, successful replication and proteolytic processing are imperative (Herold et al., 1998). Indeed, the consensus functions of these virus-encoded proteolytic proteins are found in all coronaviruses, specifically papline-like protease (PLpro) and chymotrypsin-like protease (3CLpro) (Herold et al., 1998). In proteolytic processing of pp1a and pp1ab, PLpro and 3CLpro cleave the first three sites and the remaining 11 locations, respectively, yielding a total of 16 nonstructural proteins (nsp1-16) (Hegyi et al., 2002; Needle et al., 2015). Thus, 3CLpro inhibition has been regarded as a molecular approach in anti-SARS drug discovery and developments (Chen et al., 2005; Jo et al., 2020).

SARS-COV-2 is a novel coronavirus that spreads rapidly since its identification in patients with severe pneumonia in Wuhan, China (named as COVID-19), has been reported in 25 countries, with nearly 72000 laboratory-confirmed cases and a death toll of 1775 worldwide as of Feb. 17, 2020 (*Coronavirus disease* 2019 (*Covid*-19) *Situation Report*—28, 2020; Li & De Clercq, 2020). Devastatingly, no drug or vaccine has yet been approved to treat human coronaviruses (Li & De Clercq, 2020). Concerning the current outbreak of SARS-CoV-2 and the therapeutic experience of SARS and MERS (another β coronavirus), many studies extensively investigate the possibility of using the existing antiviral agents used for HIV, hepatitis B virus, hepatitis C virus and influenza infections for the treatment or intervention of SARS-COV-2 (De Clercq & Li, 2016; Li & De Clercq, 2020). In the meantime, SARS-CoV-2 has been characterized as an enveloped, positive-sense, single-stranded RNA β coronavirus, similar to SARS and MERS (Li & De Clercq, 2020). Consistent with the characteristics of coronaviruses, SARS-CoV-2 genome encodes structural proteins (e.g., spike glycoproteins), nonstructural proteins (e.g., 3CLpro, PLpro, helicase, RNA-dependent RNA polymerase), and accessory proteins. Regarding the available genomic sequence of SARS-COV-2, SARS and MERS, a high-level conservation of the proteolytic sites and proteolytic enzymes was found, whence repurposing SARS and MERS protease inhibitors for treatment of SARS-COV-2 is worth considering (Liu et al., 2020). As 3CLpro plays a pivotal role in SARS, it is reasonable to approach protease inhibition by targeting the 3CLpro of SARS-COV-2 instead of its PLpro to intercept its lifecycle (Chen et al., 2005; Jo et al., 2020; Liu et al., 2020).

Currently, disulfiram, an approved drug to treat alcohol dependence, has been reported to inhibit the PLpro of MERS and SARS in cell cultures but has yet been evaluated clinically (Li & De Clercq, 2020). In addition, clinical trials of HIV protease inhibitors (lopinavir and ritonavir) in SARS-CoV-2 patients have also commenced, yet it is uncertain if it can effectually inhibit those of SARS-CoV-2, as HIV and β coronavirus proteases belong to the aspartic protease family and the cysteine protease family, respectively (Li & De Clercq, 2020; Zumla et al., 2016). On the other hand, remdesivir, a nucleotide analog of RNA dependent RNA polymerase inhibitor approved for HIV treatment, is currently under clinical trials in SARS-CoV-2 patients with estimated completion dates in April, 2020; galidesivir, another nucleotide analog of RNA dependent RNA polymerase inhibitor in early-stage clinical studies for HCV treatment, has shown broad-spectrum antiviral activities against severe acute respiratory syndrome (SARS), Middle East respiratory syndrome (MERS) in preclinical studies (Wang et al., 2020; Zumla et al., 2016). However, one might expect that a nucleoside analog can elicit toxicity that are still beyond our knowledge (Feng, 2018).

There are yet to find vaccines or antiviral drugs to prevent or treat human coronavirus infections. There is an urgent need for exploring and developing a safe anti-coronavirus therapy, particularly against SARS-COV-2.

BRIEF SUMMARY OF THE INVENTION

It is unexpectedly found in the present invention that some triterpenes are effective in inhibition of coronavirus infections, especially SARS-COV-2.

In one object, the present invention provides a method for preventing and/or treating a coronavirus infection, comprising administering to a subject in need thereof a compound or a pharmaceutically acceptable salt thereof, in which the compound is selected from the group consisting of:

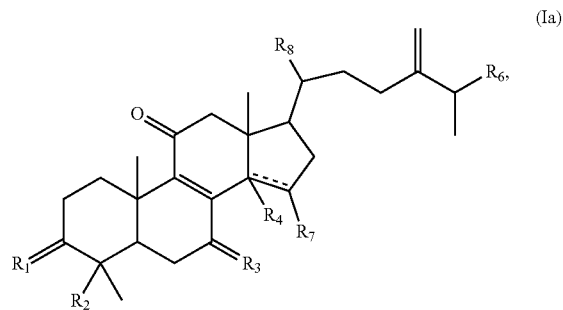

(Ia)

-continued

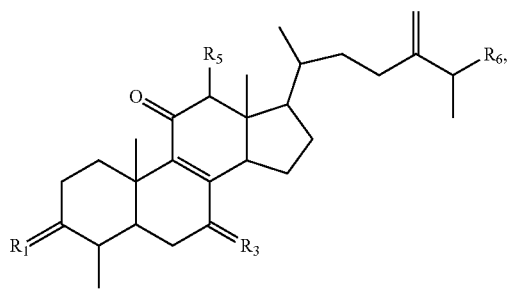
(Ib)

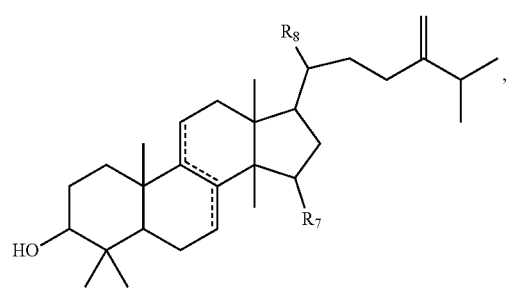
(Ic)

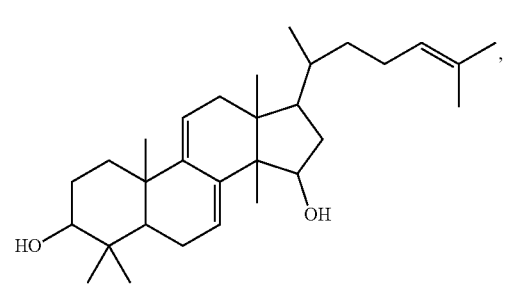
(Id)

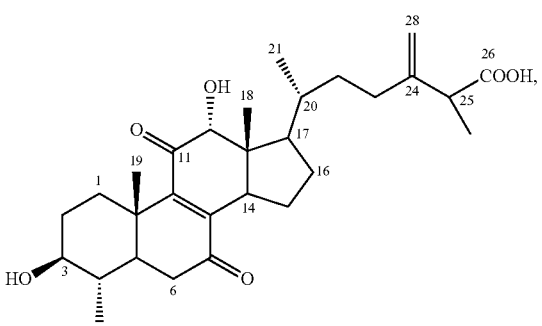
(Ie)

wherein $R_1$ is O, α-OH or β-H; $R_2$ is H or OH; $R_3$ is O, α-H, β-OH, β-OAc or $H_2$; $R_4$ is H or OH; $R_5$ is H, OH or ORx; $R_6$ is COORx or COO($CH_2$)n—$CH_3$; n is an integer from 0-3; $R_7$ is H, Oh, ORx or OAc; $R_8$ is $CH_3$ or COORx; $R_{21}$ is $CH_3$, COORx, or COO($CH_2$)n—$CH_3$; n is an integer from 0-3; the dotted line represents a single bond or a double bond, Rx is H or a $C_{1-8}$ alkyl; and

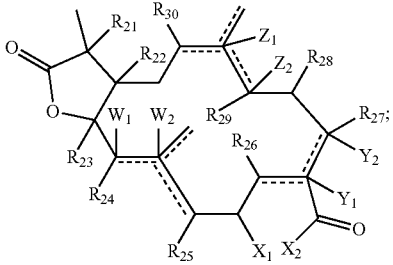
(II)

wherein each of $R_{21}$, $R_{22}$, $R_{23}$, $R_{24}$, $R_{25}$, $R_{26}$, $R_{27}$, $R_{28}$, $R_{29}$, $R_{30}$, $X_1$ and $X_2$ is H, OH, $C_{1-8}$ alkyl, NRx, SRx, ORx, pyrazoline, cysteine, glutathione, halogen, COORx, or COO($CH_2$)n—$CH_3$; n is an integer from 0-3; each of $Y_1$, $Y_2$, $Z_1$, $Z_2$, $W_1$ and $W_2$ is H, OH, $C_{1-8}$ alkyl, or $X_1$ and $X_2$ together form —O—, or $Y_1$ and $Y_2$, $Z_1$ and $Z_2$, or $W_1$ and $W_2$ together form an epoxy.

In some particular examples of the present invention, the compound is selected from the group consisting of:

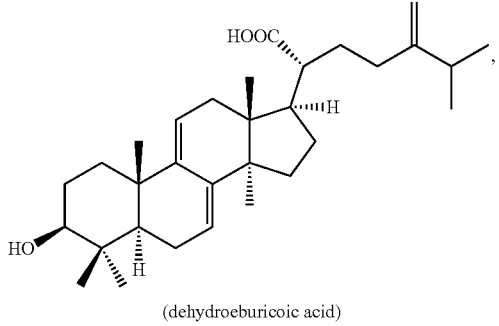
(dehydroeburicoic acid)

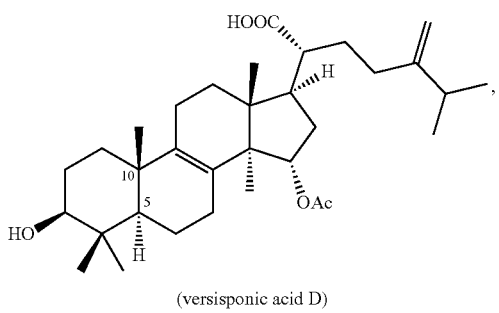
(versisponic acid D)

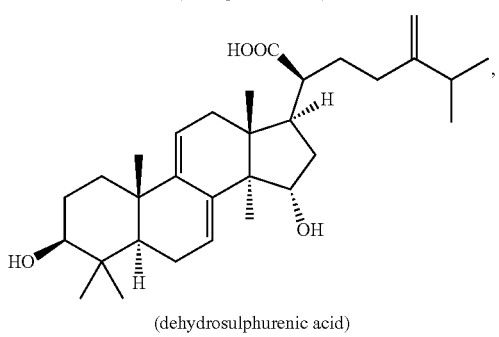
(dehydrosulphurenic acid)

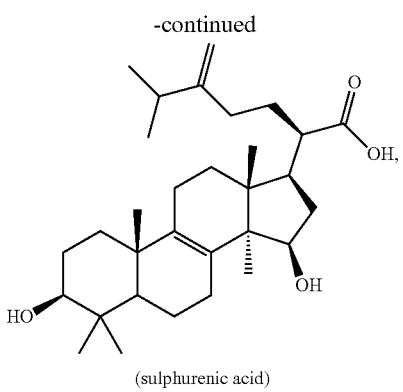

(sulphurenic acid)

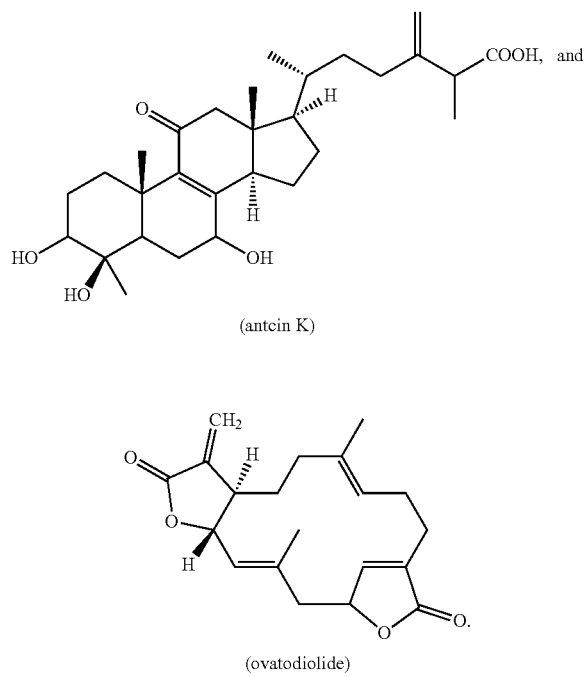

(antcin K)

(ovatodiolide)

In one further aspect, the present invention provides a composition/pharmaceutical composition for preventing and/or treating a coronavirus infection, particularly SARS-COV-2 comprising a therapeutically effective amount of any of the compounds disclosed herein or pharmaceutically acceptable thereof, or its mixture, in combination of a pharmaceutically acceptable carrier.

Optionally, the composition/pharmaceutical composition according to the invention may comprise at least one additional anti-viral therapeutic agent.

In one yet aspect, the present invention provides a use of any of the compounds disclosed herein or pharmaceutically acceptable salts, or its mixture for manufacturing a medicament for preventing and/or treating a coronavirus infection, particularly SARS-COV-2.

It is to be understood that both the foregoing general description and the following detailed description are exemplary and explanatory only and are not restrictive of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred.

In the drawings.

DETAILED DESCRIPTION OF THE INVENTION

Figure 1:
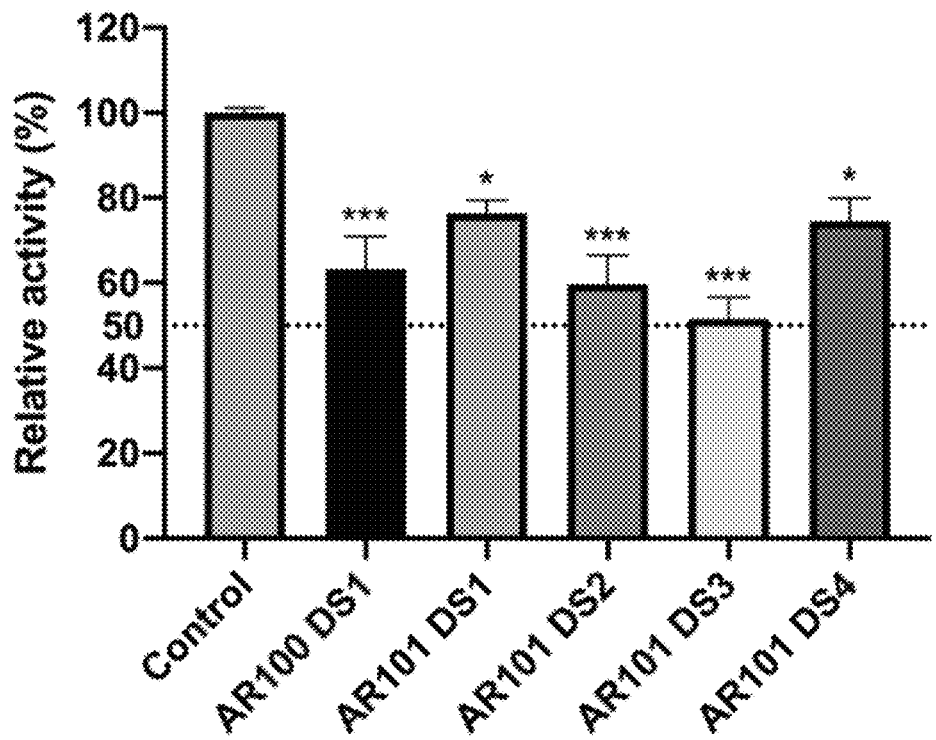
FIG. 1 shows the inhibitory profiles of AR100-DS1, AR101 DS1, AR101 DS2, AR101 DS3 and AR101 DS4 at the concentration of 20 µM. *, P<0.05; , P<0.01; *, P<0.001.

The above summary of the present invention will be further described with reference to the embodiments of the following examples. However, it should not be understood that the content of the present invention is only limited to the following embodiments, and all the inventions based on the above-mentioned contents of the present invention belong to the scope of the present invention.

Unless defined otherwise, all technical and scientific terms used herein have the same meaning as commonly understood by a person skilled in the art to which this invention belongs.

As used herein, the singular forms "a", "an", and "the" include plural referents unless the context clearly dictates otherwise. Thus, for example, reference to "a sample" includes a plurality of such samples and equivalents thereof known to those skilled in the art.

In the present invention, to evaluate the effect of prospecting drugs on proteolytic processing inhibition in high-throughput, the synthetic peptides labelled fluorescence resonance energy transfer (FRET) pairs were employed as those used in the previous studies, in which the quenched fluorophore is released upon cleavage of the FRET-labelled peptides, generating fluorescent signals that can be monitored in real-time (Chen et al., 2005; Jean et al., 1995; Jo et al., 2020). It is confirmed in the present invention that any or its mixture of the compounds disclosed herein is effective in inhibition of a cysteine protease, particularly 3CLpro of SARS-CoV-2.

The present invention provides a method for preventing and/or treating a coronavirus infection, particularly SARS-COV-2 comprising administering to a subject in need thereof a compound or pharmaceutically acceptable salt thereof, or its mixture, in which the compound is selected from the group consisting of:

(1)

(Ia)
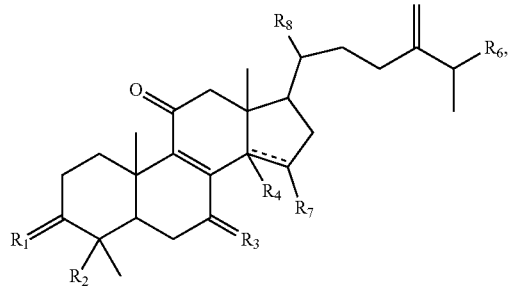

(Ib)
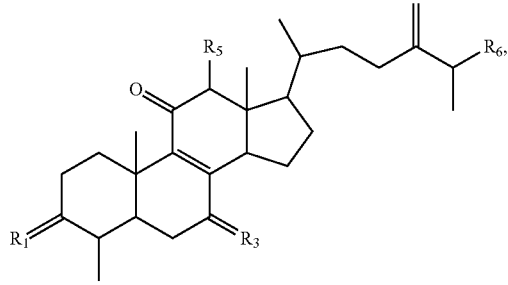

(Ic)
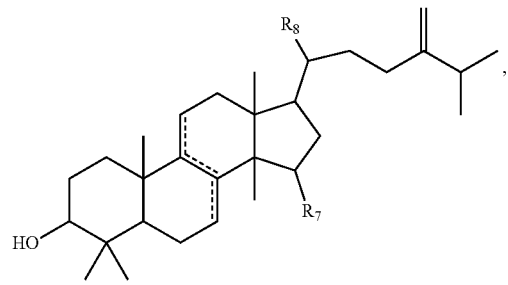

(Id)
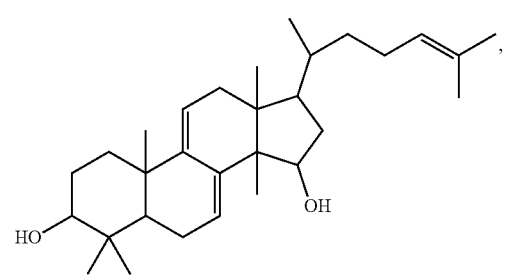

(Ie)
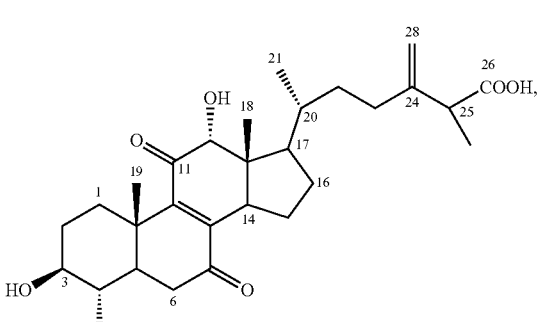

wherein $R_1$ is O, α-OH or β-H; $R_2$ is H or OH; $R_3$ is O, α-H, β-OH, β-OAc or $H_2$; $R_4$ is H or OH; $R_5$ is H, OH or ORx; $R_6$ is COORx or COO(CH$_2$)n—CH$_3$; n is an integer from 0-3; $R_7$ is H, Oh, ORx or OAc; $R_8$ is CH$_3$ or COORx; $R_{21}$ is CH$_3$, COORx, or COO(CH$_2$)n—CH$_3$; n is an integer from 0-3; the dotted line represents a single bond or a double bond, Rx is H or a $C_{1-8}$ alkyl; and (II)
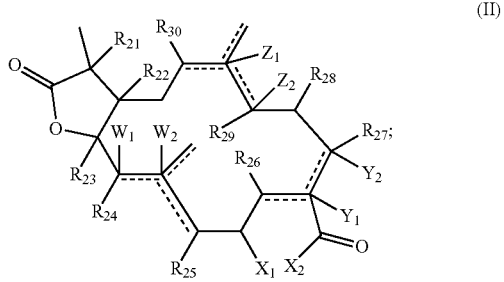

wherein each of $R_{21}$, $R_{22}$, $R_{23}$, $R_{24}$, $R_{25}$, $R_{26}$, $R_{27}$, $R_{28}$, $R_{29}$, $R_{30}$, $X_1$ and $X_2$ is H, OH, $C_{1-8}$ alkyl, NRx, SRx, ORx, pyrazoline, cysteine, glutathione, halogen, COORx, or COO(CH$_2$)n—CH$_3$; n is an integer from 0-3; each of $Y_1$, $Y_2$, $Z_1$, $Z_2$, $W_1$ and $W_2$ is H, OH, $C_{1-8}$ alkyl, or $X_1$ and $X_2$ together form —O—, or $Y_1$ and $Y_2$, $Z_1$ and $Z_2$, or $W_1$ and $W_2$ together form an epoxy.

The present invention also provides a composition/pharmaceutical composition for preventing and/or treating a coronavirus infection, particularly SARS-COV-2 infection, which comprises a therapeutically effective amount of a compound as disclosed herein or mixture thereof and a pharmaceutically acceptable carrier.

In one embodiment, the compound is (1)

(Ia)
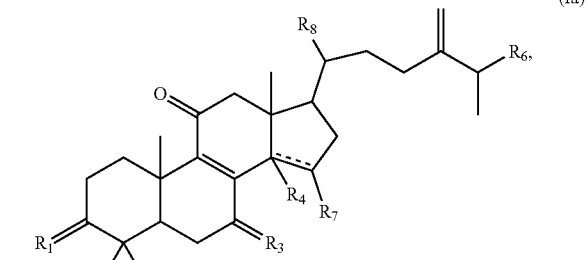

(Ib)
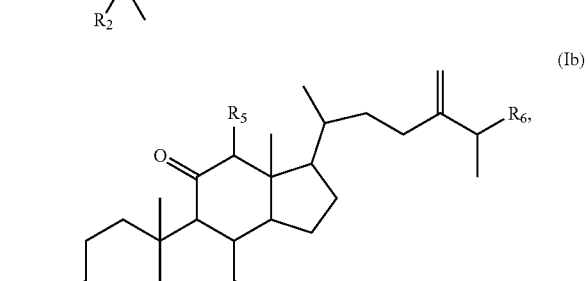

-continued

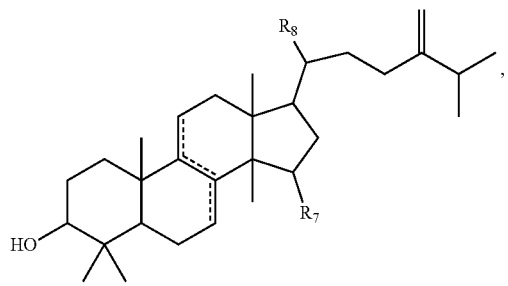
(Ic)

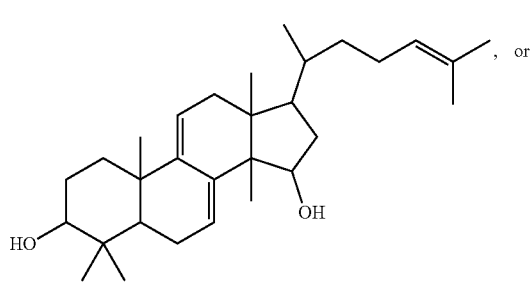
(Id), or

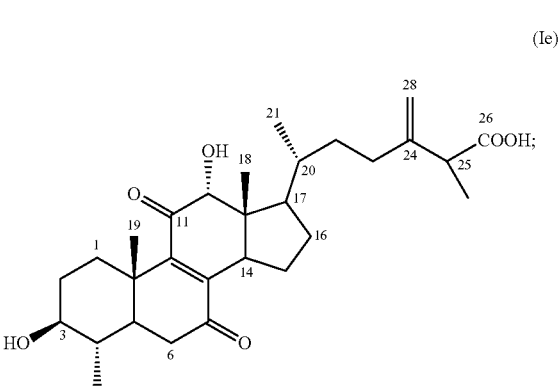
(Ie)

wherein R$_1$ is O, α-OH or β-H; R$_2$ is H or OH; R$_3$ is O, α-H, β-OH, β-OAc or H$_2$; R$_4$ is H or OH; R$_5$ is H, OH or ORx; R$_6$ is COORx or COO(CH$_2$)n—CH$_3$; n is an integer from 0-3; R$_7$ is H, Oh, ORx or OAc; R$_8$ is CH$_3$ or COORx; R$_{21}$ is CH$_3$, COORx, or COO(CH$_2$)n—CH$_3$; n is an integer from 0-3; the dotted line represents a single bond or a double bond, Rx is H or a C$_{1-8}$ alkyl; or (2)

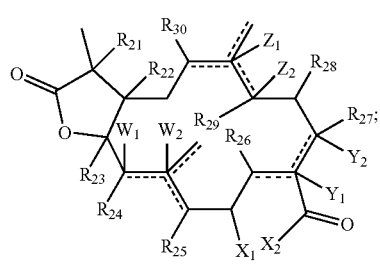
(II)

wherein each of R$_{21}$, R$_{22}$, R$_{23}$, R$_{24}$, R$_{25}$, R$_{26}$, R$_{27}$, R$_{28}$, R$_{29}$, R$_{30}$, X$_1$ and X$_2$ is H, OH, C$_{1-8}$ alkyl, NRx, SRx, ORx, pyrazoline, cysteine, glutathione, halogen, COORx, or COO(CH$_2$)n—CH$_3$; n is an integer from 0-3, Rx is H or a C$_{1-8}$ alkyl; each of Y$_1$, Y$_2$, Z$_1$, Z$_2$, W$_1$ and W$_2$ is H, OH, C$_{1-8}$ alkyl, X$_1$ and X$_2$ together form —O—, or Y$_1$ and Y$_2$, Z$_1$ and Z$_2$, or W$_1$ and W$_2$ together form an epoxy.

In the example of the invention, the compound of formula (I) may be:

[Structure of antcin skeleton with R$_1$, R$_2$, R$_3$, R$_4$ substituents and COOH side chain]

|         | R$_1$ | R$_2$ | R$_3$ | R$_4$ | Δ  |
|---------|-------|-------|-------|-------|-----|
| Antcin A | O     | H     | H$_2$ | H     |     |
| Antcin B | O     | H     | O     | H     |     |
| Antcin C | O     | H     | β-OH  | H     |     |
| Antcin D | O     | H     | O     | OH    |     |
| Antcin E | O     | H     | H$_2$ | H     | 14  |
| Antcin F | O     | H     | β-OH  | H     | 14  |
| Antcin K | α-OH  | OH    | β-OH  | H     |     |

In another example of the invention, the compound of formula (I) may be:

[Structure with R$_1$, R$_4$, R$_7$, R$_8$, R$_6$ substituents]

R$_7$ = H; R$_8$ = CH$_3$

|                | R$_1$         | R$_4$ | R$_5$ | R$_6$  |
|----------------|---------------|-------|-------|--------|
| Zhankuic acid B | β-H<br>α-OH  | H     | H     | COOH   |
| Zhankuic acid C | β-H<br>α-OH  | H     | OH    | COOH   |
| Zhankuic acid D | O             | H     | H     | COOEt  |
| Zhankuic acid E | β-H<br>α-OH  | H     | OH    | COOEt  |

In one yet example of the invention, the compound of formula (I) may be:

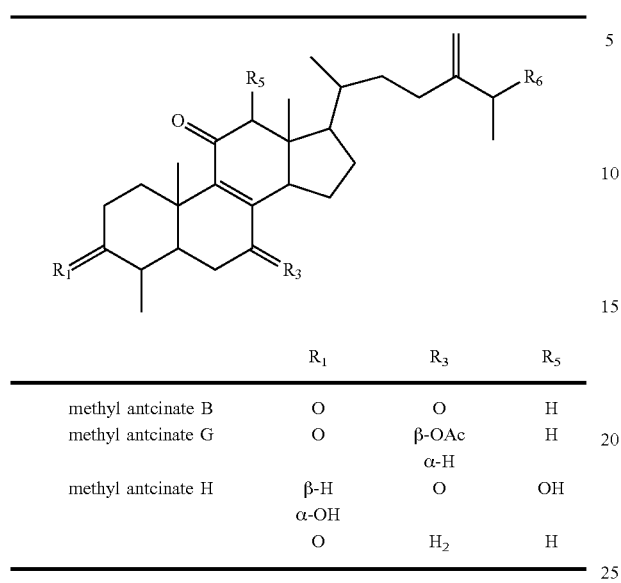

| | $R_1$ | $R_3$ | $R_5$ |
|---|---|---|---|
| methyl antcinate B | O | O | H |
| methyl antcinate G | O | β-OAc<br>α-H | H |
| methyl antcinate H | β-H<br>α-OH | O | OH |
| | O | $H_2$ | H |

In further example of the invention, the compound of formula (I) may be:

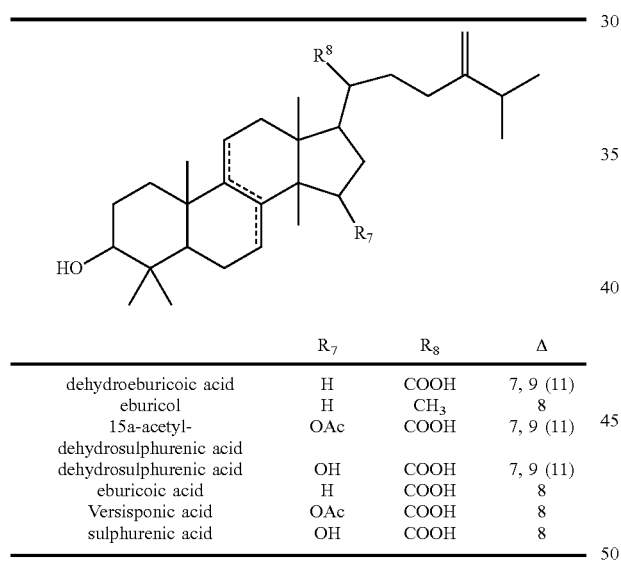

| | $R_7$ | $R_8$ | Δ |
|---|---|---|---|
| dehydroeburicoic acid | H | COOH | 7, 9 (11) |
| eburicol | H | $CH_3$ | 8 |
| 15a-acetyl-dehydrosulphurenic acid | OAc | COOH | 7, 9 (11) |
| dehydrosulphurenic acid | OH | COOH | 7, 9 (11) |
| eburicoic acid | H | COOH | 8 |
| Versisponic acid | OAc | COOH | 8 |
| sulphurenic acid | OH | COOH | 8 |

In one particular example of the invention, the compound of formula (I) may be lanostane:

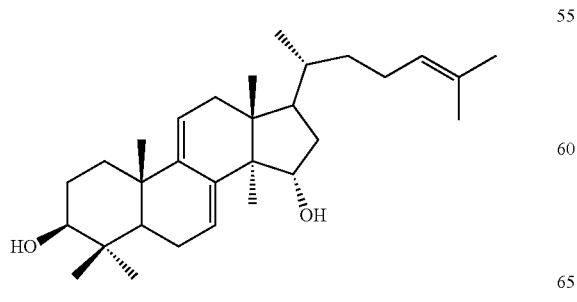

In addition, the compound of formula (II) may be

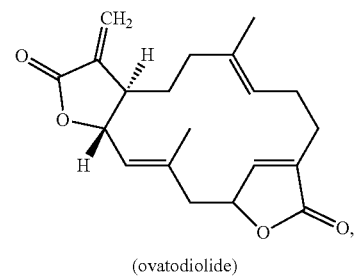

(ovatodiolide)

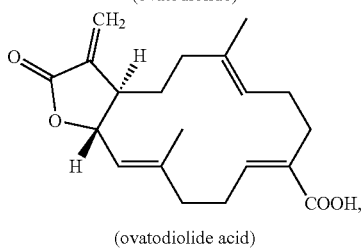

(ovatodiolide acid)

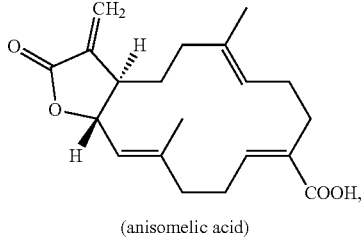

(anisomelic acid)

Modification 1

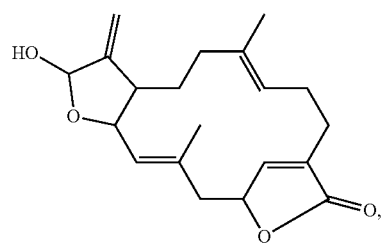

Modification 2

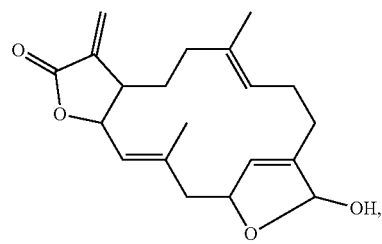

Modification 3

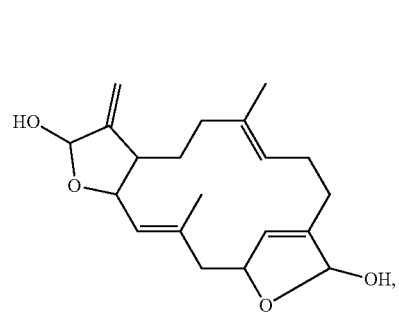

-continued
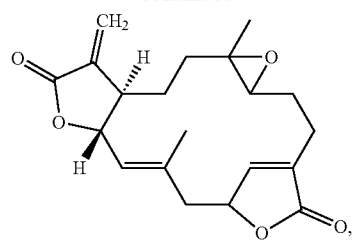
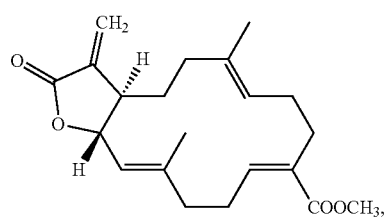
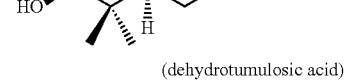
or its derivatives, such as
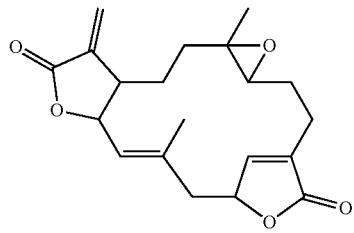
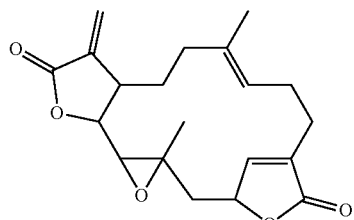
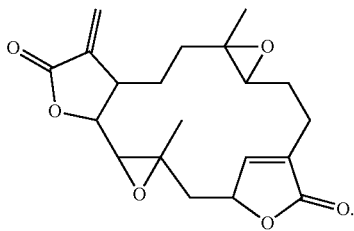
Accordingly, the preferred compound is selected from the group consisting of:
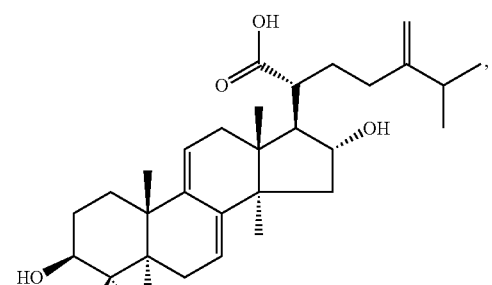
(dehydrotumolosaeure)
(dehydrotumulosic acid)

-continued

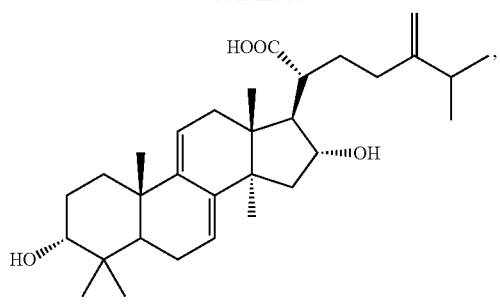
(3-epi-dehydrotumulosic acid)

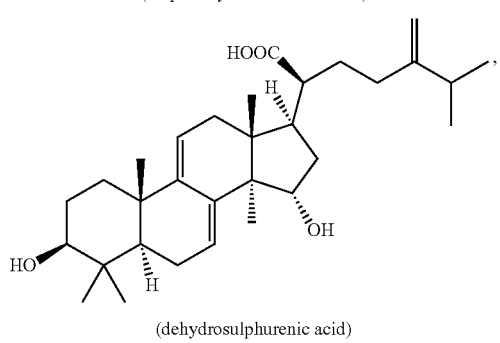
(dehydrosulphurenic acid)

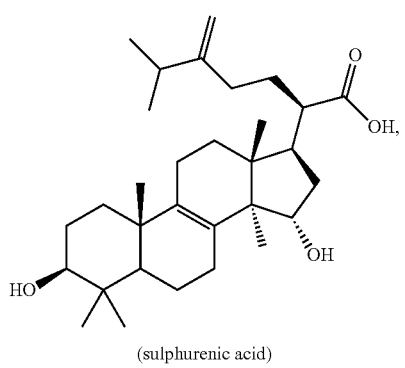
(sulphurenic acid)

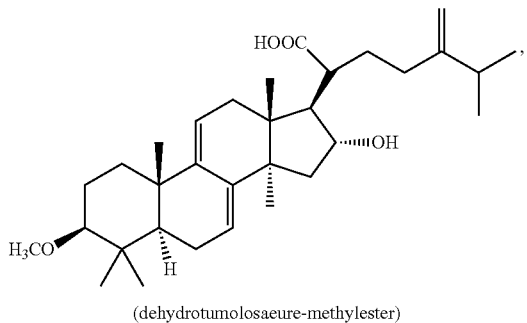
(dehydrotumolosaeure-methylester)

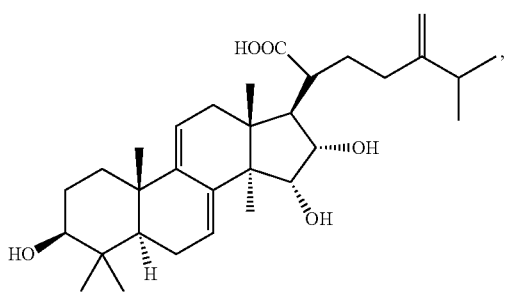
((20ξ)-3β, 15α, 16α-trihydroxy-24-methyllanosta-7,9(11), 24(241)-trien-21-oic acid; 15α-hydroxydehydrotumulosic acid)

-continued

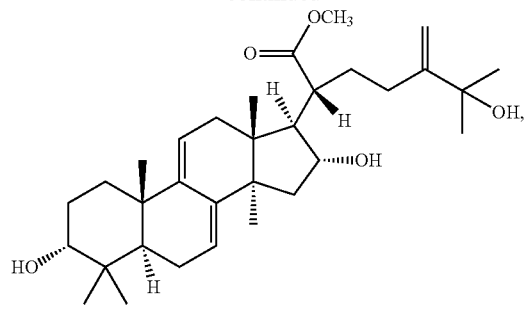
(methyl 25-hydroxy-3-epidehydrotumulosate(methyl))

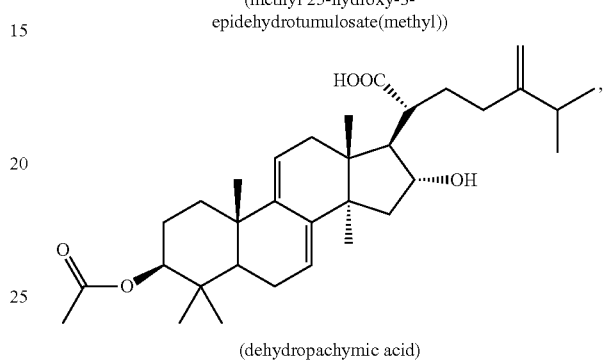
(dehydropachymic acid)

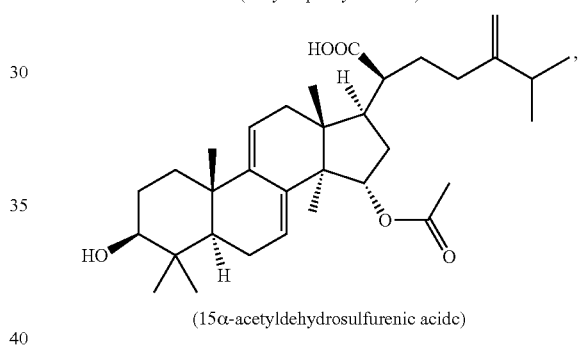
(15α-acetyldehydrosulfurenic acidc)

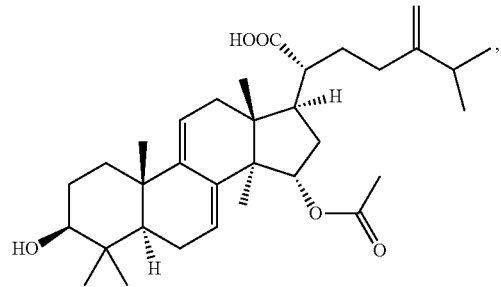
(15α-acetyldehydrosulfurenic acidc)

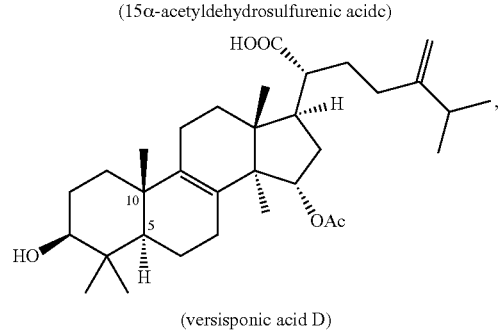
(versisponic acid D)

-continued
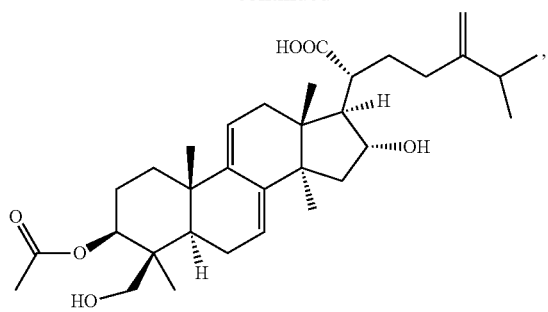
(29-hydroxydehydropachymic acid; (3β, 16α)-3-(acetyloxy)-16, 29-dihydroxy-24-methylidenelanosta-7,9(11)- dien-21-oic acid)
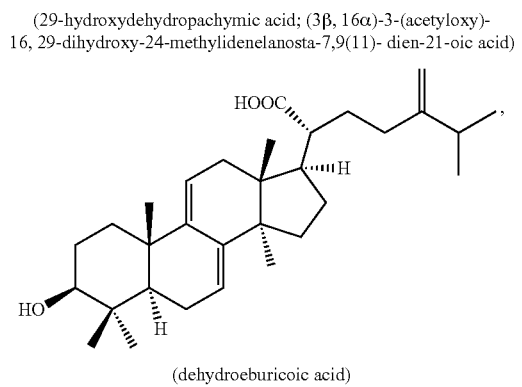
(dehydroeburicoic acid)
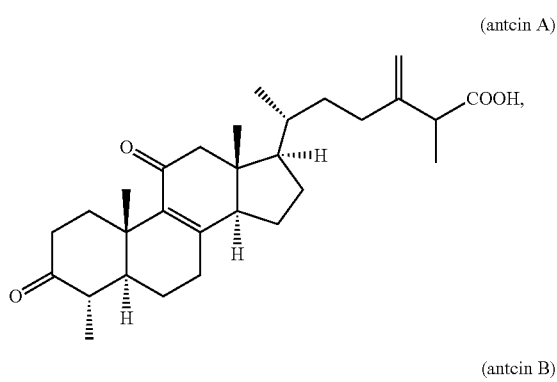
(antcin B)
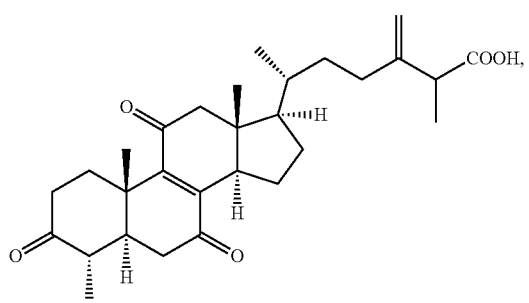
(antcin C)
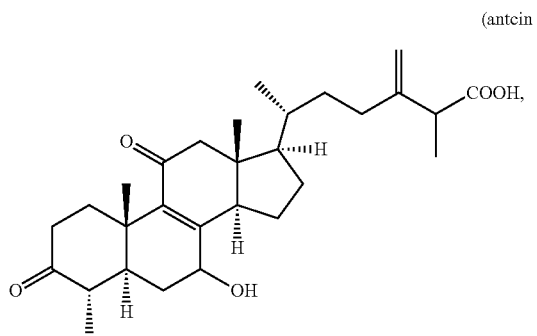
-continued
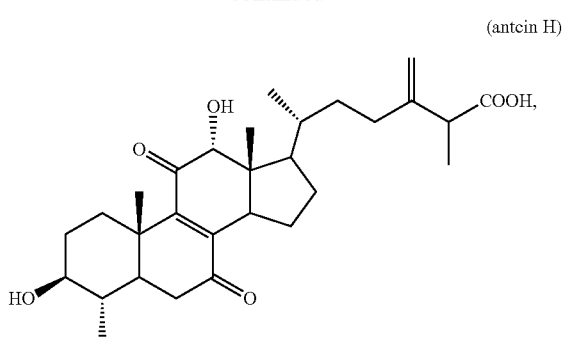
(antcin H)
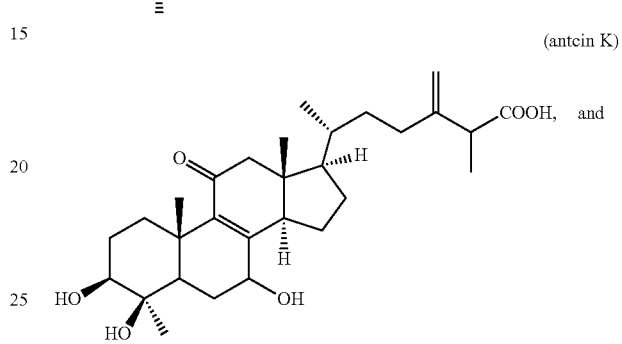
(antcin K)
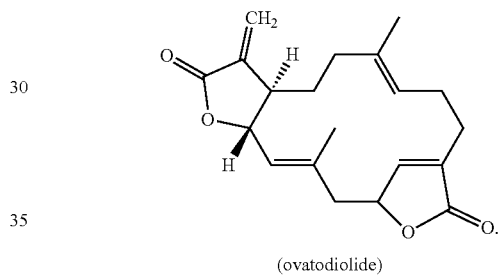
(ovatodiolide)
According to the invention, the most preferred compound is selected from the group consisting of:
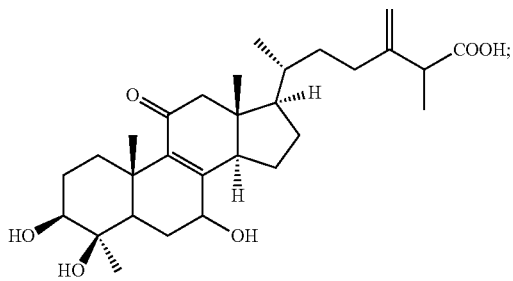
(antcin K, AR101 DS01)
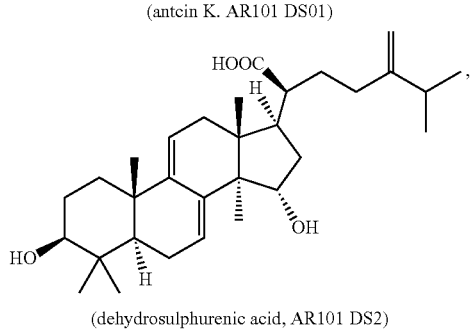
(dehydrosulphurenic acid, AR101 DS2)

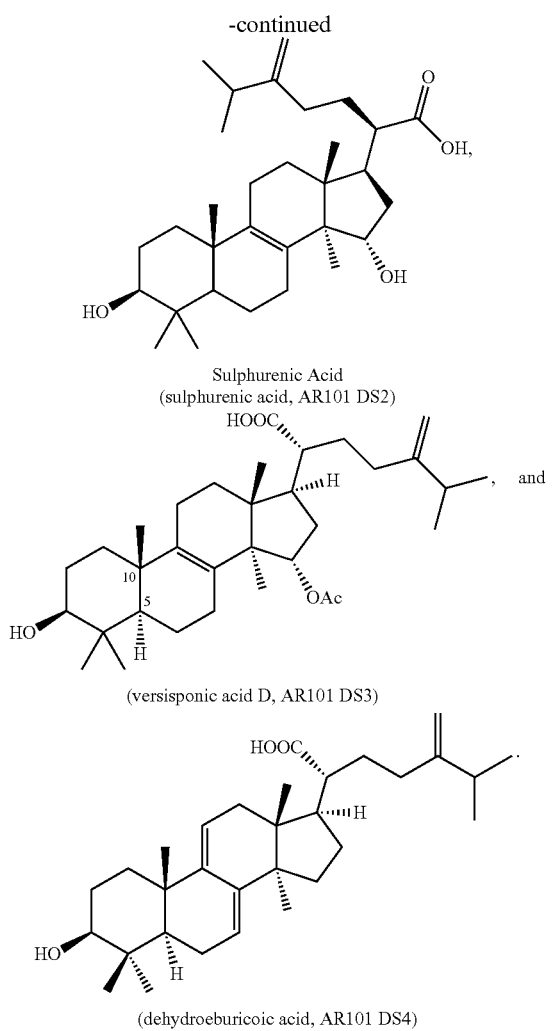

Sulphurenic Acid
(sulphurenic acid, AR101 DS2)

(versisponic acid D, AR101 DS3)

(dehydroeburicoic acid, AR101 DS4)

In one particular example of the invention, the compound of formula (II) is

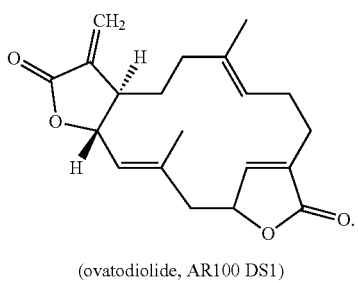 [SMILES: C=C1C(=O)O[C@H]2/C=C(\C)CC3C=C(CC/C=C(\C)CC[C@H]12)C(=O)O3]

(ovatodiolide, AR100 DS1)

The term "coronavirus" as used herein refers to a Coronaviruse in the subfamily Orthocoronavirinae, the family Coronaviridae, order Nidovirales, and realm Riboviria, which is enveloped viruses with a positive-sense single-stranded RNA genome and a nucleocapside of helical symmetry. They have characteristic club-shaped spikes that project from their surface, which in electron micrographs create an image reminiscent of the solar corona from which their name derives. Coronaviruses cause diseases in mammals and birds, including humans. In humans, coronaviruses cause respiratory tract infections, including common cold, severe acute respiratory syndrome (SARS), Middle East respiratory syndrome (MERS), and SARS-COV-2.

The term "cysteine protease" as used herein refers to thiol proteases, are enzymes that degrade proteins, sharing a common catalytic mechanism that involves a nucleophilic cysteine thiol in a catalytic triad or duad. One example of cysteine protease in a virus is 3CLpro in SARS-COV-2.

The term "treat," "treating" or "treatment" as used herein refers to the application or administration of a composition including one or more active agents to a subject afflicted with a disease, a symptom or conditions of the disease, or a progression of the disease, with the purpose to cure, heal, alleviate, relieve, alter, remedy, ameliorate, improve, or affect the disease, the symptoms or conditions of the disease, the disabilities induced by the disease, or the progression of the disease.

The term "prevent," "prevention" or "preventing" as used herein refers to the prevention of the recurrence, onset, or development of a virus infection, one or more symptoms thereof, or a respiratory condition associated with, potentiated by, or potentiating a coronavirus infection in a subject.

The term "subject" as used herein includes human or non-human animals, such as companion animals (e.g. dogs, cats, etc.), farm animals (e.g. cattle, sheep, pigs, horses, etc.), or experimental animals (e.g. rats, mice, guinea pigs, etc.).

The term "therapeutically effective amount" as used herein refers to an amount of a pharmaceutical agent which, as compared to a corresponding subject who has not received such amount, results in an effect in treatment, healing, prevention, or amelioration of a disease, disorder, or side effect, or a decrease in the rate of advancement of a disease or disorder. The term also includes within its scope amounts effective to enhance normal physiological function.

For use in therapy, the therapeutically effective amount of the compound is formulated as a pharmaceutical composition for administration. Accordingly, the invention further provides a pharmaceutical composition comprising a therapeutically effective amount of any or its mixture of these compounds disclosed herein, and one or more pharmaceutically acceptable carriers.

For the purpose of delivery and absorption, a therapeutically effective amount of the active ingredient according to the present invention may be formulated into a pharmaceutical composition in a suitable form with a pharmaceutically acceptable carrier. Based on the routes of administration, the pharmaceutical composition of the present invention comprises preferably from 0.1% to 100% in weight of the total weight of the active ingredient.

The term "pharmaceutically acceptable carrier" used herein refers to a carrier(s), diluent(s) or excipient(s) that is acceptable, in the sense of being compatible with the other ingredients of the formulation and not deleterious to the subject to be administered with the pharmaceutical composition. Any carrier, diluent or excipient commonly known or used in the field may be used in the invention, depending to the requirements of the pharmaceutical formulation. Said carrier may be a diluent, vehicle, excipient, or matrix to the active ingredient. Some examples of appropriate excipients include lactose, dextrose, sucrose, sorbose, mannose, starch, Arabic gum, calcium phosphate, alginates, tragacanth gum, gelatin, calcium silicate, microcrystalline cellulose, polyvinyl pyrrolidone, cellulose, sterilized water, syrup, and methylcellulose. The composition may additionally comprise lubricants, such as talc, magnesium stearate, and mineral oil; wetting agents; emulsifying and suspending agents; preservatives, such as methyl and propyl hydroxybenzoates; sweeteners; and flavoring agents.

The composition of the present invention can provide the effect of rapid, continued, or delayed release of the active ingredient after administration to the patient. According to the invention, the pharmaceutical composition may be adapted for administration by any appropriate route, including but not limited to oral, rectal, nasal, topical, vaginal, or parenteral route (such as intramuscular, intravenous, subcutaneous, and intraperitoneal), transdermal, suppository, and intranasal methods.

Regarding parenteral administration, it is preferably used in the form of a sterile water solution, which may comprise other substances, such as salts or glucose sufficient to make the solution isotonic to blood. The water solution may be appropriately buffered (preferably with a pH value of 3 to 9) as needed. Preparation of an appropriate parenteral composition under sterile conditions may be accomplished with standard pharmacological techniques well known to persons skilled in the art.

In one particular example of the invention, the pharmaceutical composition is formulated for oral administration. Such formulations may be prepared by any method known in the art of pharmacy. According to the present invention, the form of said composition may be tablets, pills, powder, lozenges, packets, troches, elixers, suspensions, lotions, solutions, syrups, soft and hard gelatin capsules, suppositories, sterilized injection fluid, and packaged powder.

In the invention, the method and composition/pharmaceutical composition are effective in treating a virus infection through an inhibition of a cysteine protease in a virus, particularly an RNA-dependent virus. Accordingly, the invention also provides a method and composition/pharmaceutical composition for treatment and/or prevention of a virus infection through inhibition of a cysteine protease in a virus, comprising using the compounds disclosed herein or pharmaceutically acceptable salt thereof.

Exemplified viruses which are responsive include, without limitation, a coronavirus, and a HIV. Preferably, the viral infection is a coronavirus. More preferably, the viral infection is a SARS, MERS and SARS-COV-2.

In another aspect, the present invention provides a method for treating or preventing an RNA-dependent virus infection through inhibiting a cysteine protease in a virus. One example of the virus is an RNA-dependent virus, such as SARS, MERS and SARS-COV-2; particularly SARS-COV-2.

In one further aspect, the present invention provides a composition/pharmaceutical composition for treating and/or preventing a virus infection through inhibiting a cysteine protease in a virus, which comprises any of the compounds disclosed herein, pharmaceutically acceptable salt thereof, or its mixture. Optionally, the composition/pharmaceutical composition may comprise at least one additional anti-viral therapeutic agent.

In one further aspect, the present invention provides a use of any of the compounds disclosed herein for manufacturing a medicament for treating or preventing a virus infection through inhibiting a cysteine protease in a virus.

The present invention is further illustrated by the following examples, which are provided for the purpose of demonstration rather than limitation.

EXAMPLES

Materials and Methods

I. FRET Protease Assays with the SARS-CoV-2 3CLpro

The establishment of an ED-FRET platform follows the protocol given by Jo et al. (2020). Briefly, a custom proteolytic, fluorogenic peptide with DABCYL and EDANS on ends, DABCYL-TSAVLQSGFRKMG-EDANS (Genomics, Taiwan), contains the consensus nsp4/nsp5 cleavage sequence that can be recognized by 3CLpro of SARS-CoV-2. The peptide is dissolved in distilled water and incubated with 3CLpro of SARS-CoV-2. Measurements of the spectral-based fluorescence are determined by a SPARK® multimode microplate reader provided by TECAN. The proteolytic activity is determined at 37° C. by fluorescent intensity of EDANS upon peptide hydrolysis as a function of time, in which $\lambda_{excitatron}$=340 nm, $\lambda_{emission}$=490 nm, bandwidths=9, 15 nm, respectively. Prior to the assay, the emission wavelength of the testing drugs at 340 nm excitation is examined to ensure that it does not overlap with the emission spectrum of EDANS.

Assays are conducted in triplicate in black 96-well microplates (Greiner) in 100 µL assay buffers containing 3CLpro of SARS-CoV-2 and the customized peptide. In SARS 3CLpro assay, 1 µM SARS-CoV-2 3CLpro containing 50 mM Tris pH 6.5 is incubated with 5 µM fluorescent substrate at 37° C. for 3 h before measuring Relative Fluorescence Unit (RFU).

II. Inhibition Assays in the Presence of the Compounds According to the Invention There are five example compounds (AR100-DS1, AR101-DS1, AR101-DS2, AR101-DS3, and AR101-DS4) in the first screening process at 20 µM (n=3). The five compounds are given in the table below.

| Compound No. | Compound Name and Structure |
|---|---|
| AR100-DS1 | Ovatodiolide |
| AR101-DS1 | 25R-Antcin K |

-continued

| Compound No. | Compound Name and Structure |
|---|---|
| AR101-DS2 | 25S-Antcin K |
| | dehydrosulphurenic acid |
| | Sulphurenic Acid |
| AR101-DS3 | Versisponic acid D |
| AR101-DS4 | Dehydroeburicoic Acid |

At first, the SARS-CoV-2 3CLpro and Arjil drugs will be mixed and pre-incubate at 37° C. for 1 h. Those manifesting inhibitory activity against 3CLpro of SARS-CoV-2 will be investigated further at different concentrations to characterize their IC50 values, using GraphPad Prism 7.03 (GraphPad Software, San Diego, Calif., USA).

Based the knowledge and sequence-based SARS-CoV-2 3CLpro, the efficacy of 3CLpro inhibiting the compounds according to the invention were assessed in vitro to determine their therapeutic potential in SARS-CoV-2 treatment. Concerning that no drug or vaccine has yet been approved to treat human SARS-CoV-2 infection, developing a broad-spectrum antiviral agent to combat against SARS-CoV-2 is of utmost importance and urgency. Enactment of ED-FRET technology and its workflow provides a robust, high-throughput drug discovery in the lab. Meanwhile, identification of SARS-CoV-2 3CLpro inhibiting agents from the 5 example compounds according to the invention acts as guidelines of probable therapeutic doses in clinical assessment and prompts patent application in the future, contributing to antiviral library construction.

III. Results

1. Identification of SARS-CoV-2 3CLpro Inhibitors

To determine the efficacy of the five example compounds according to the invention, SARS-CoV-2 3CLpro, IQF peptide substrate, and the example compounds were incubated in the constructed ED-FRET platform at 0.5 µM, 5 µM and 20 µM, respectively. As shown in FIG. 1, all five of the example compounds substantially inhibited the peptide-cleaving activity of SARS-CoV-2 3CLpro. Among these five example compounds, AR101 DS2 and AR101 DS3 manifested the utmost inhibitory effect upon at 20 µM. In particular, the SARS-CoV-2 3CLpro inhibition at the percentage of about 50% was found after three-hour treatment of AR101 DS3, while AR101 DS2 demonstrated an inhibition by 40% in the same condition, marking their potentials in combating the polyprotein processing cycle of SARS-CoV-2.

2. Characterization of the Half Maximal Inhibitory Concentration of Inhibitors

Figure 2A:
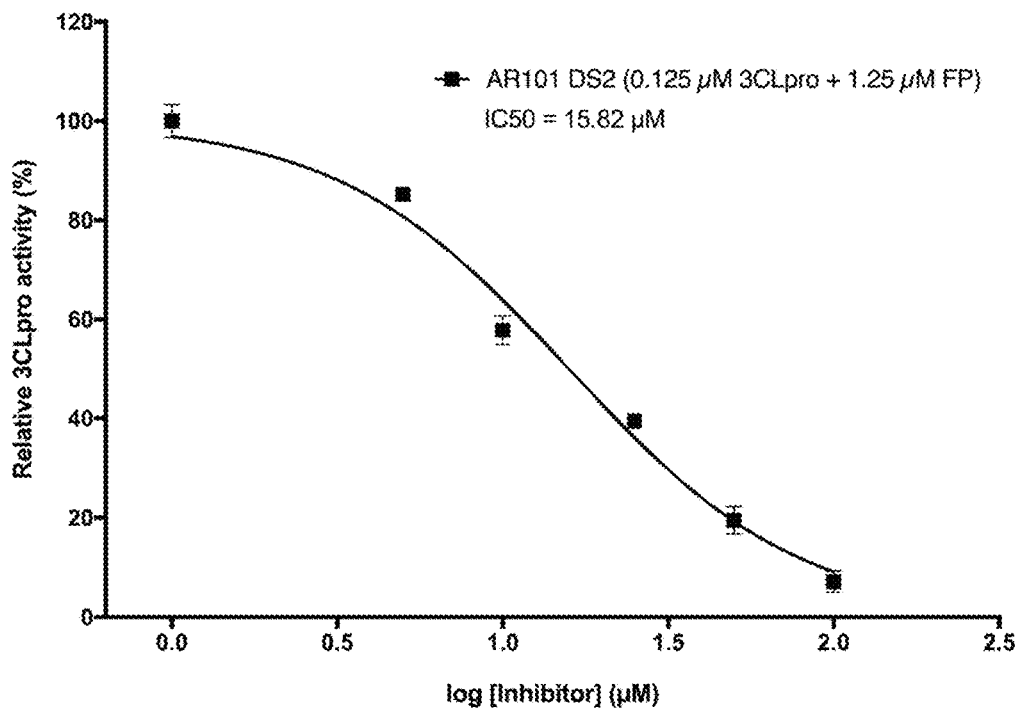
FIG. 2A shows the relative 3CLpro activity (%) of AR101 DS2 (0.5p/5FP), and IC50=39 µM.
Figure 2B:
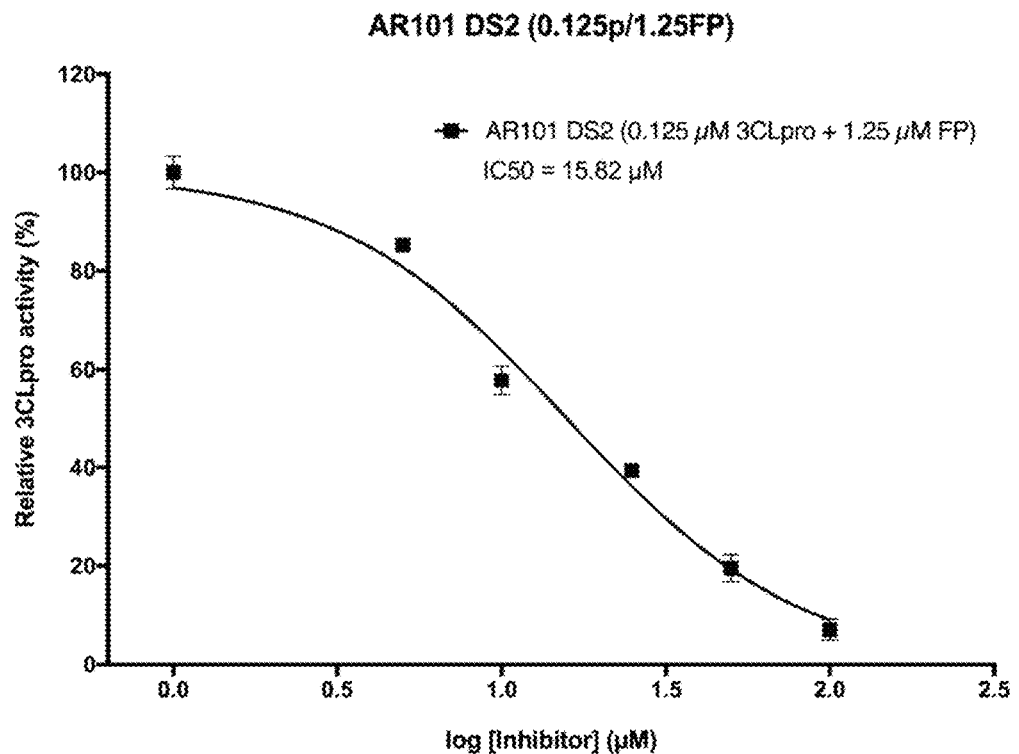
FIG. 2B shows the relative 3CLpro activity (%) of AR101 DS2 (0.125p/1.25FP), and IC50=15.82 µM.
Figure 2C:
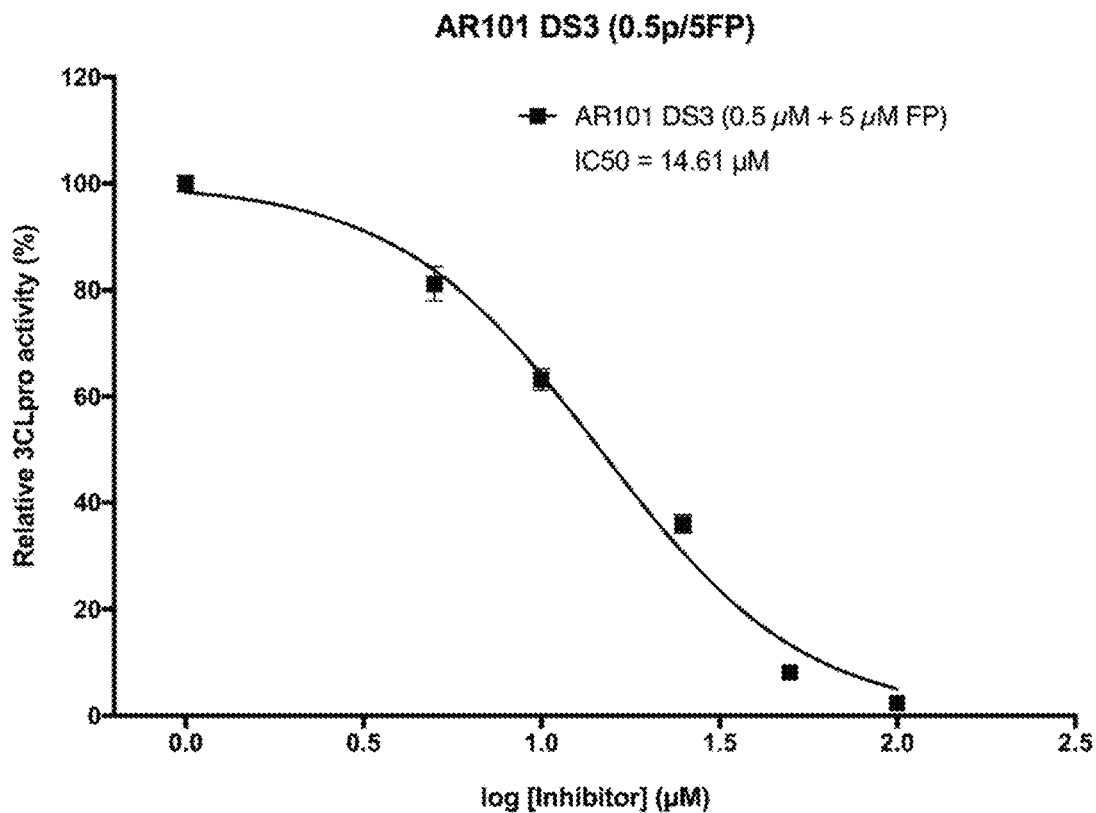
FIG. 2C shows the relative 3CLpro activity (%) of AR101 DS3 (0.5p/5FP), and IC50=14.61 µM.
Figure 2D:
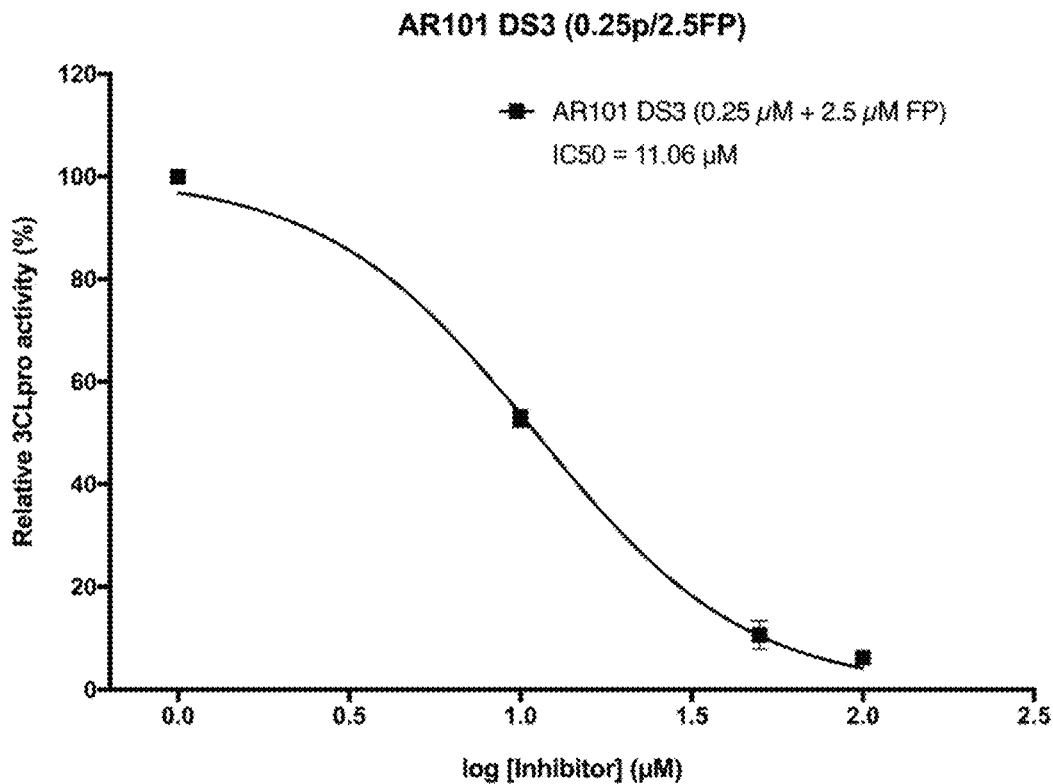
FIG. 2D shows the relative 3CLpro activity (%) of AR101 DS3 (0.5p/5FP), and IC50=11.06 µM.
Figure 2E:
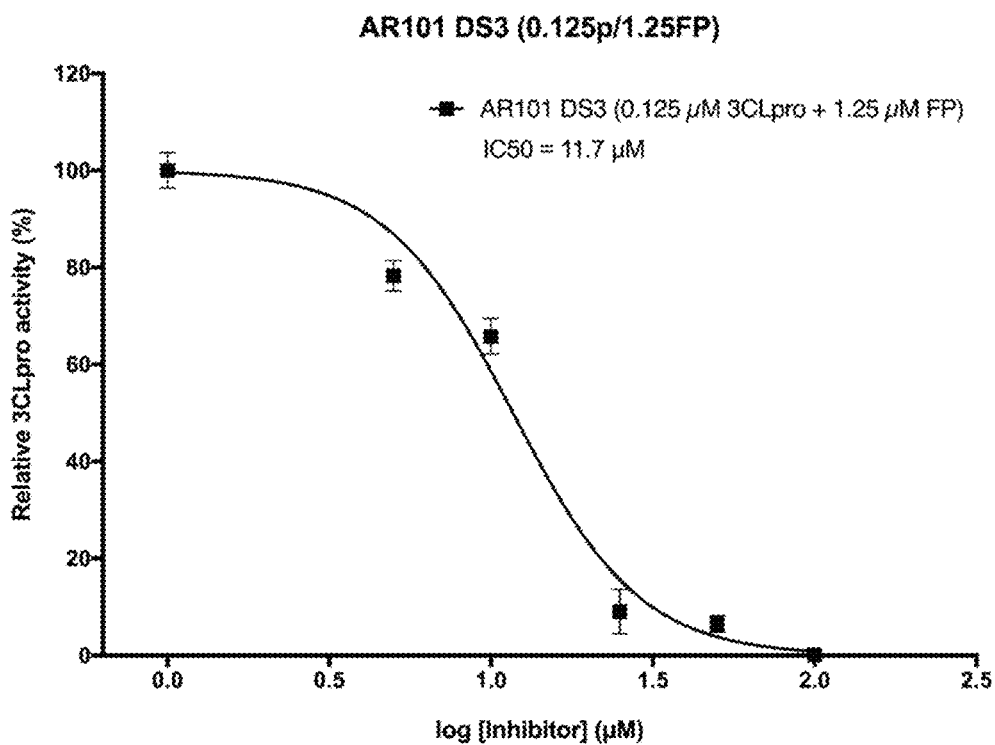
FIG. 2E shows the relative 3CLpro activity (%) of AR101 DS3 (0.125p/1.25FP), and IC50=11.7 µM.

The inhibitory profiles of AR100-DS1, AR101 DS1, AR101 DS2, AR101 DS3 and AR101 DS4 at the concentration of 20 µM were determined and given in FIG. 1. As given in FIG. 1, the half maximal inhibitory concentration (IC) toward SARS-CoV-2 3CLpro was characterized by treating the compounds at the indicated concentrations ranging from 0 µM to 200 µM. The IC50 values of AR101 DS2 and AR101 DS3 were given in FIGS. 2A-2E. As shown in FIG. 2A, AR101 DS2 had an IC50 value of 39 µM in the presence of 0.5 µM SARS-CoV-2 3CLpro and 5 µM IQF peptide substrate (FP). Meanwhile, the inhibition of 0.125 µM AR101 DS2 on SARS-CoV-2 3CLpro and 1.25 µM IQF peptide substrate was determined (see FIG. 2B), the IC50 value of AR101 DS2 against SARS-CoV-2 situated at 15.82 µM. As for the IC50 value of AR101 DS3, 50% SARS-CoV-2 3CLpro inhibition was reached at 14.61 µM in 0.5 µM SARS-CoV-2 3CLpro and 5 µM IQF peptide substrate (see FIG. 2C), at 11.06 µM in 0.25 µM SARS-CoV-2 3CLpro and 2.5 µM IQF peptide substrate (see FIG. 2D), or at 11.7 µM in 0.125 µM SARS-CoV-2 3CLpro and 1.25 µM IQF peptide substrate (see FIG. 2E).

Figure 3:
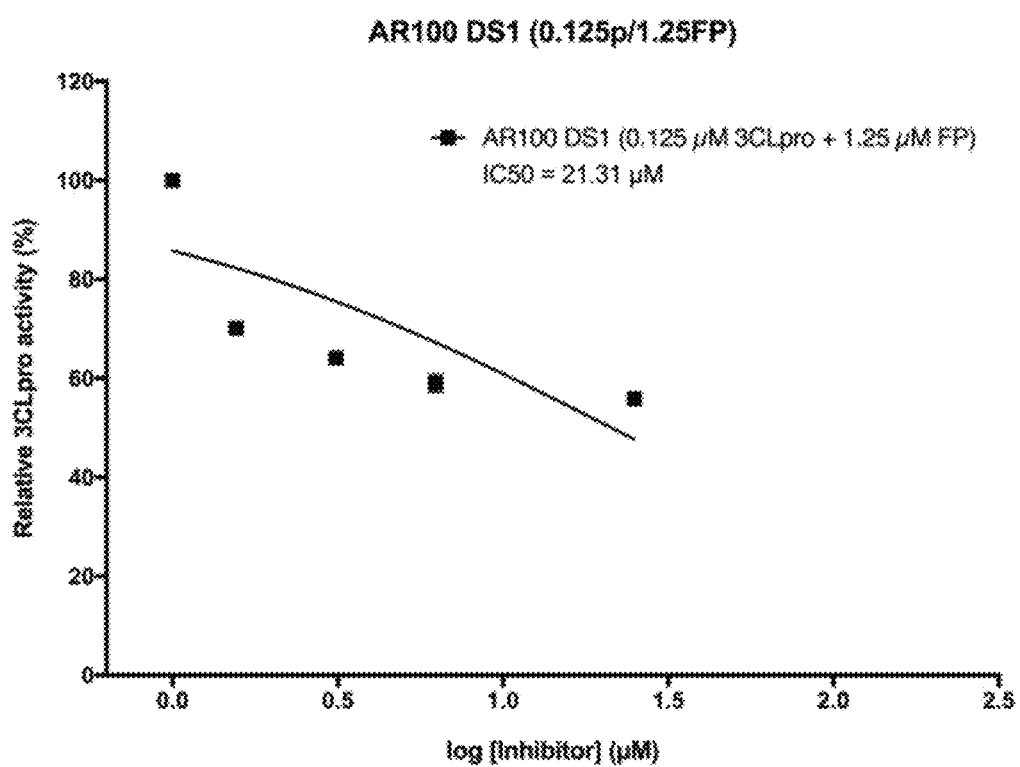
FIG. 3 shows the relative 3CLpro activity (%) of AR100 DS1 (0.125p/1.25FP), and IC50=21.31 µM.

The IC50 values of AR100 DS1 were given in FIG. 3. AR100 DS1 had an IC50 value of 21.31 µM in the presence of 0.125 µM SARS-CoV-2 3CLpro and 1.25 µM IQF peptide substrate.

Given the above, all the example compounds including AR100 DS1, AR101 DS1, AR101 DS2, AR101 DS3 and AR101 DS4 were confirmed to have the inhibitory effect on SARS-CoV-2 3CLpro highlights their therapeutic potentials against SARS-CoV-2, particularly AR100 DS1, AR101 DS2 and AR101 DS3.

All publications, patents, and patent documents cited herein above are incorporated by reference herein, as though individually incorporated by reference.

The invention has been described with reference to various specific and preferred embodiments and techniques. However, one skilled in the art will understand that many variations and modifications may be made while remaining within the spirit and scope of the invention.

REFERENCES

1. Chan, J. F.-W., Kok, K.-H., Zhu, Z., Chu, H., To, K. K.-W., Yuan, S., & Yuen, K.-Y. (2020). Genomic characterization of the 2019 novel human-pathogenic coronavirus isolated from a patient with atypical pneumonia after visiting Wuhan. *Emerging Microbes & Infections,* 9(1), 221-236.
2. Chen, C.-N., Lin, C. P. C., Huang, K.-K., Chen, W.-C., Hsieh, H.-P., Liang, P.-H., & Hsu, J. T. A. (2005). Inhibition of SARS-CoV 3C-like Protease Activity by Theaflavin-3,3'-digallate (TF3). *Evidence-based complementary and alternative medicine: eCAM* 2(2), 209-215. doi:10.1093/ecam/neh081
3. *Coronavirus disease* 2019 (*SARS-CoV-2*) *Situation Report*—28. (2020). Retrieved from https://www.who.int/emergencies/diseases/novel-coronavirus-2019/situation-reports:
4. De Clercq, E., & Li, G. (2016). Approved antiviral drugs over the past 50 years. *Clinical microbiology reviews,* 29(3), 695-747.
5. Feng, J. Y. (2018). Addressing the selectivity and toxicity of antiviral nucleosides. *Antiviral Chemistry and Chemotherapy,* 26, 2040206618758524. doi:10.1177/2040206618758524
6. Hegyi, A., Friebe, A., Gorbalenya, A. E., & Ziebuhr, J. (2002). Mutational analysis of the active centre of coronavirus 3C-like proteases. *Journal of General Virology,* 83(3), 581-593.
7. Herold, J., Gorbalenya, A. E., Thiel, V., Schelle, B., & Siddell, S. G. (1998). Proteolytic processing at the amino terminus of human coronavirus 229E gene 1-encoded polyproteins: identification of a papain-like proteinase and its substrate. *Journal of Virology,* 72(2), 910-918.
8. Jean, F., Basak, A., DiMaio, J., Seidah, N., & Lazure, C. (1995). An internally quenched fluorogenic substrate of prohormone convertase 1 and furin leads to a potent prohormone convertase inhibitor. *Biochemical Journal,* 307(3), 689-695.
9. Jo, S., Kim, S., Shin, D. H., & Kim, M.-S. (2020). Inhibition of SARS-CoV 3CL protease by flavonoids. *Journal of enzyme inhibition and medicinal chemistry,* 35(1), 145-151.
10. Li, G., & De Clercq, E. (2020). Therapeutic options for the 2019 novel coronavirus (SARS-CoV-2). In: Nature Publishing Group.
11. Liu, W., Morse, J. S., Lalonde, T., & Xu, S. (2020). Learning from the Past: Possible Urgent Prevention and Treatment Options for Severe Acute Respiratory Infections Caused by 2019-nCoV. *ChemBioChem.*
12. Needle, D., Lountos, G. T., & Waugh, D. S. (2015). Structures of the Middle East respiratory syndrome coronavirus 3C-like protease reveal insights into substrate specificity. *Acta Crystallographica Section D: Biological Crystallography,* 71(5), 1102-1111.
13. Wang, M., Cao, R., Zhang, L., Yang, X., Liu, J., Xu, M., . . . Xiao, G. (2020). Remdesivir and chloroquine effectively inhibit the recently emerged novel coronavirus (SARS-CoV-2) in vitro. *Cell Research,* 1-3.
14. Zumla, A., Chan, J. F., Azhar, E. I., Hui, D. S., & Yuen, K.-Y. (2016). Coronaviruses—drug discovery and therapeutic options. *Nature reviews Drug discovery,* 15(5), 327.

What is claimed is:

1. A method for inhibiting SARS-COV-2 infection comprising
administering to a subject in need thereof a pharmaceutical composition comprising a therapeutically effective amount of a compound or pharmaceutically acceptable salt thereof, or its mixture, in which the compound is selected from the group consisting of:

(versisponic acid D)

and (dehydroeburicoic acid)

* * * * *